Jan. 29, 1924. 1,482,225
W. P. EVANS
DOLL HEAD BEARING AND PACKING DEVICE FOR DRYING CYLINDERS
Filed March 7, 1923. 2 Sheets-Sheet 1

INVENTOR:
BY William P. Evans
Wm Wallace White
ATTY.

Jan. 29, 1924.

W. P. EVANS 1,482,225

DOLL HEAD BEARING AND PACKING DEVICE FOR DRYING CYLINDERS

Filed March 7, 1923    2 Sheets-Sheet 2

INVENTOR:
William P. Evans
BY Wm Wallace White
ATTY.

Patented Jan. 29, 1924.

1,482,225

UNITED STATES PATENT OFFICE.

WILLIAM PARSONAGE EVANS, OF MANCHESTER, ENGLAND.

DOLL-HEAD BEARING AND PACKING DEVICE FOR DRYING CYLINDERS.

Application filed March 7, 1923. Serial No. 623,359.

*To all whom it may concern:*

Be it known that I, WILLIAM PARSONAGE EVANS, a subject of the King of Great Britain and Ireland, residing at 72 Park Lane, Irlams-o'th-Height, Manchester, in the county of Lancaster, England, have invented new and useful Improvements in Doll-Head Bearing and Packing Devices for Drying Cylinders, of which the following is a specification.

These improvements have reference to doll-head bearing and packing devices for supporting and packing the axles or necks of drying cylinders and such like, as is known, and in particular to the type of doll-head structure which combines a bearing, a lubricating arrangement and means for packing the axle or neck.

It has been proposed to apply packing above the neck or axle and to ensure a joint by effecting a frictional drive between axle or neck, packing and combined elements, but such is not always effective because the drive is not positive, and slip is liable to occur which means defective packing and considerable wear.

According to my invention I enclose or surround the packing lying above the neck or axle by gland-like parts and I arrange that same shall be positively rotated, and, at the same time, I provide for adjustment of the packing without necessarily having to exert very great pressure upon same. The result obtained, is, that the enclosing or encircling gland-like parts are positively compelled to rotate whilst the packing only needs to effect a packing action and is acted upon with this object in view.

Thus I can positively ensure rotation of the gland-like parts and adjust the pressure on the packing independently so that same is no longer made to act as a driver but is capable of regulated compression merely to exercise a proper packing result.

The nature of my improvements will be understood by indicating constructions of doll-head according to my invention without however limiting myself to such particular constructions.

The attached drawings illustrate approved constructions of doll-head and combined bearing, embodying the indicated features of novelty, and, in such drawings:—

Figure 7:
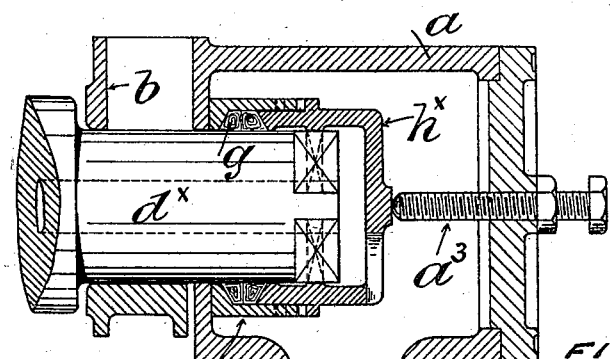
Fig. 7 shows a sectional elevation of a modified construction wherein the male gland element is driven from the axle and the female element from the male.

Fig. 7ª is a detail plan showing the driving connection between the gland elements.

Figure 8:
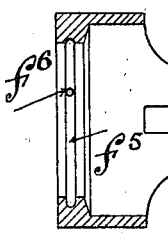
Figure 9:
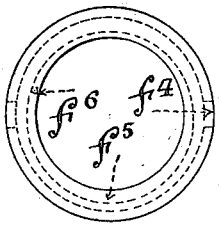

Figs. 8 and 9 show two views of a modified construction of female gland element which is intended to be driven by a ball clutch type of interconnecting means for the cylinder axle.

In the illustrated construction, I show a doll-head casting or stand $a$ which is cored out and made to the desired design, the stand portion $a'$ being hollow as known and the complete doll-head fashioned for ready fixing. A grease or lubricant box $b$ and bearing $c$ is or may be formed with or attached to the doll-head casting and such grease box and bearing is with advantage located on the inner face of the doll head as Fig. 1 clearly indicates. The doll-head casting $a$ has an outside removable cover plate $a^2$ through which passes a screwed stud $a^3$, or a screwed spindle and wheel, or any other adjusting means. Said cover plate $a^2$ permits of easy access to the interior of the doll-head casting.

I reduce the diameter of the hollow axle or neck $d$ of the drying cylinder as at $d'$ and I turn such reduced end. The unreduced portion of the hollow axle or neck $d$ I machine to produce a "squared" portion or four flats $d^2$, or I otherwise apply to or prepare the same with a regular or irregular end or extremity, the use of flats shown of a depth of say $\frac{1}{2}''$ or more or less serving the purpose well. The unreduced portion of the axle end or neck is adequately supported by a provided bearing in some such manner as indicated, and same is lubricated from the grease box or in other obvious fashion. The construction of the actual bearing is variable.

Figure 1:
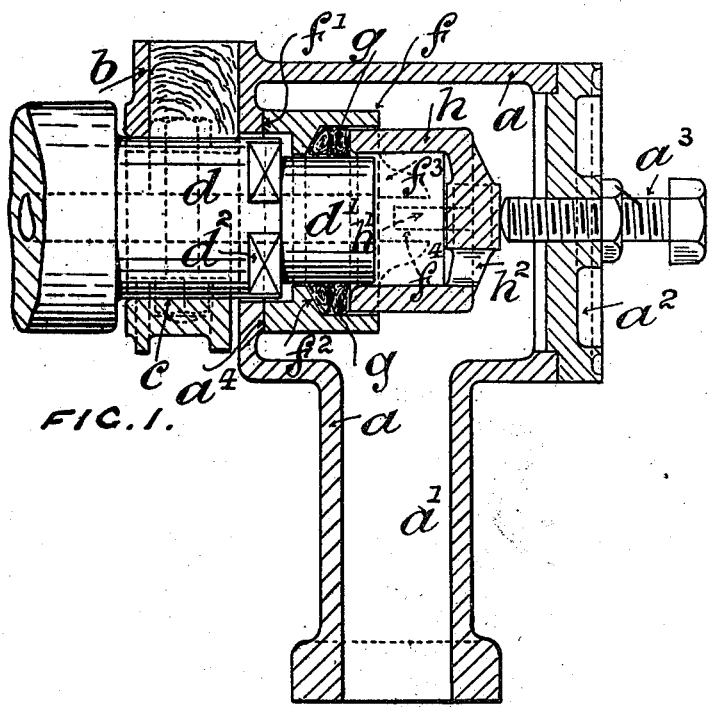
Fig. 1 shows a sectional elevation of the complete doll-head.
Figure 2:
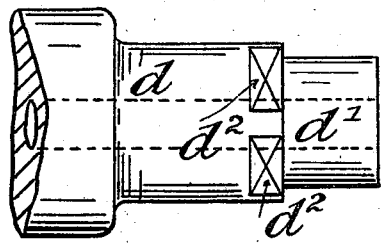
Fig. 2 is a separate detail of the end of the axle or neck of the drying cylinder.
Figure 3:
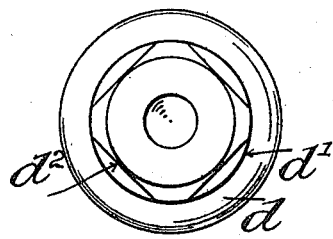
Fig. 3 is an end view of Fig. 2.
Figure 4:
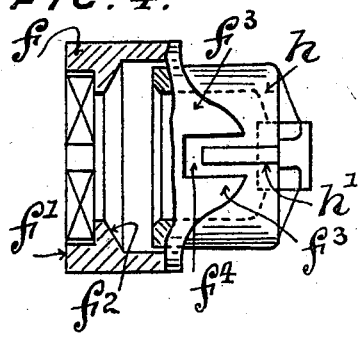
Fig. 4 shows partly in section an elevation of the driven gland like elements.
Figure 5:
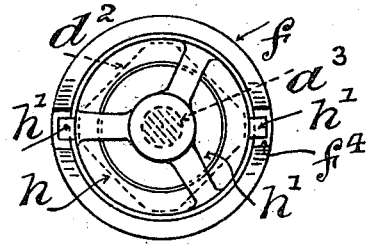
Fig. 5 is an end elevation of Fig. 4.
Figure 6:
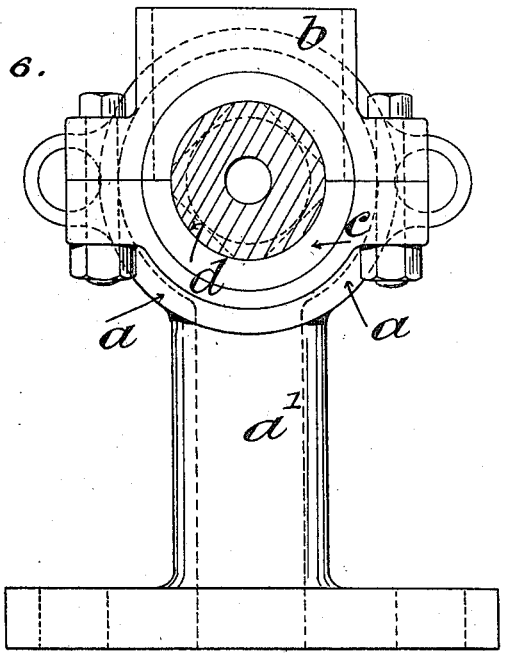
Fig. 6 is an end view of the doll head shown in Fig. 1.

Over the prepared end of the axle or neck $d$ I apply a correspondingly recessed sleeve $f$ or female rotatable gland-like element shown clearly in Figs. 1, 4 and 5. The one face $f'$ of this sleeve $f$ makes a faced or proper joint with a face $a^4$ on the inside of the doll-head casting. Packing or packing means may be introduced for this joint. Said recessed sleeve or rotatable gland-like element $f$ also presents an outwardly directed sleeve-like cavity when applied over the reduced portion $d'$ of the axle or neck and such sleeve like cavity receives the packing such as the packing marked $g$, and this packing surrounds the reduced portion $d'$ of the axle or neck and beds against the shoulder $f^2$. Such recessed sleeve or female gland like element $f$ has projections or extensions $f^3$ in which open-ended rectangular gaps or slots $f^4$ are formed.

Fitting and projecting into the annular cavity of the sleeve $f$ is a male rotatable gland-like element $h$ which is properly bored and turned as to its interior and exterior, the same being in the form of an open ended cylinder (see the Figs. 4 and 5) and which has two side projections or wings $h'$ which engage the rectangular gaps or slots $f^4$ in the sleeve $f$ the wings and slots being of such size as to permit adjustment of the packing at all times. The male rotatable gland-like element $h$ has a gap or gaps such as $h^2$ to allow passage of fluid. Its partly closed or rear end is shaped for contact with and is acted upon by the screw $a^3$ or other equivalent means provided for regulating adjustment.

From the foregoing, it will be appreciated that the gland-like elements are interconnected one with another and with the cylinder axle or neck and so are compelled to rotate, whilst the packing is at any time independently adjustable from outside in the simplest fashion.

It is obvious that more than two rotatable elements may be comprised in the positively actuated encircling gland structure and also that the way of interconnecting the revolvable elements one with another and with the neck or axle or a driving part in connection therewith to ensure a positive drive may be of any type which will give the result desired and need not be extensively enlarged upon.

Figure 7A:

As an alternative example the Fig. 7 illustrates the shaped male element $h^x$ as interlocking with and being first driven from the prepared end of the axle $d^x$ whilst a telescopic or accommodating inter-connection exists between the male element $h^x$ and the female element $f^x$, the latter in this case being driven from the former (see Fig. 7a). The Figs. 8 and 9 indicate a female gland element having an eccentric groove or recess $f^5$ and loose ball $f^6$ which applied to the axle end provide a clutch driven gland element, the male element being driven from the female element by any inter-connecting means. If desired keys and grooves may constitute the inter-connecting means between driver and gland elements. Such represent obvious variations again only using two elements plus adjusting means and amplifies the suggestion of variations made above.

The constructions described and illustrated herein are exceedingly simple and effective for the purpose and ensure a proper joint at all times as the elements are bound to rotate whilst the packing is at all times independently adjustable.

I declare that what I claim is:

1. A doll-head bearing for drying cylinders, comprising a stand, a cylinder, a prepared neck on the cylinder, a gland element fitting the prepared neck on the cylinder, and driven therefrom, a second gland element driven from the other gland element, packing material acted upon by the gland elements, and adjusting means acting upon a gland element to compress the packing.

2. A doll-head bearing for drying cylinders, consisting of a stand, a bearing combined therewith, a cylinder, a prepared neck on the cylinder, a gland element about the cylinder neck, a second gland element concentric with the neck, a packing material between the gland elements, driving connections between cylinder neck and the gland elements and means for acting on the gland elements to permit independent adjustment of the packing.

3. A doll-head bearing for drying cylinders, comprising a stand, a neck bearing combined with the stand, a cylinder axle, a prepared neck on the axle, a gland element, means to drive said element from the prepared neck, a second gland element co-operating with the first, means to drive the one gland element from the other, packing material between the gland elements, a removable cover for the stand, and adjustable means for acting upon a gland element for the independent adjustment of the packing.

4. A doll-head bearing for drying cylinders, combining a hollow stand, a bearing for a drying cylinder neck, a prepared and bored neck, a gland element about the neck, a second gland element co-operating with the first, means to drive one gland element from the neck and means to drive the one gland element from the other, a packing between the gland elements, and a fluid aperture in the gland element, a removable cover for the stand, and means to act on a gland element for independent adjustment of the packing.

5. A doll-head bearing for drying cylinders, comprising a hollow stand, an axle bearing combined with the stand, a lubricant box, a prepared cylinder neck, a gland element about the neck, a second gland element, means for driving one gland element from the neck, and intermediate driving mechanism between the two gland elements, packing between the gland elements, a fluid outlet in one of the gland elements, a removable cover to the stand, and adjustable means acting on a gland element to adjust the packing as set forth.

6. A doll-head bearing for drying cylinders, combining a hollow stand, a bearing, a lubricant box, a prepared neck, a gland element driven from the neck, a second gland element driven from the first, a packing intermediate of the gland elements, an aperture in the prepared neck, an outlet in one of the gland elements, a removable cover, and an adjusting device acting end-on upon the adjustable gland element, as described herein.

7. A doll-head bearing comprising a hollow stand, an axle bearing, a lubricant box, a prepared neck on the axle, a gland element lying about the neck and driven therefrom, a second gland element engaging with and driven from the other gland element, packing between the gland elements, an aperture in the gland element, a removable cover for the hollow stand, and an adjusting screw acting upon one of the gland elements to allow of independent adjustment of the packing by movement of the gland element, as described and shown herein.

In testimony whereof I have signed my name to this specification.

WILLIAM PARSONAGE EVANS.